US012761440B2

(12) United States Patent
Noda et al.

(10) Patent No.: US 12,761,440 B2
(45) Date of Patent: Oct. 13, 2026

(54) OPTICAL CABLE MEMBER, TOWING MEMBER, AND TOWING METHOD

(71) Applicant: SUMITOMO ELECTRIC OPTIFRONTIER CO., LTD., Yokohama (JP)

(72) Inventors: Tetsuya Noda, Yokohama (JP); Hidenori Yamazaki, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 553 days.

(21) Appl. No.: 18/018,328

(22) PCT Filed: Aug. 24, 2021

(86) PCT No.: PCT/JP2021/031000
§ 371 (c)(1),
(2) Date: Jan. 27, 2023

(87) PCT Pub. No.: WO2022/045139
PCT Pub. Date: Mar. 3, 2022

(65) Prior Publication Data

US 2023/0228962 A1 Jul. 20, 2023

(30) Foreign Application Priority Data

Aug. 26, 2020 (JP) ................................ 2020-142575

(51) Int. Cl.
*G02B 6/54* (2006.01)
*G02B 6/44* (2006.01)
(Continued)

(52) U.S. Cl.
CPC ............... *G02B 6/545* (2023.05); *G02B 6/46* (2013.01); *G02B 6/50* (2013.01); *G02B 6/508* (2013.01); *G02B 6/4407* (2013.01); *G02B 6/4434* (2013.01)

(58) Field of Classification Search
CPC ...... G02B 6/4407; G02B 6/4434; G02B 6/46; G02B 6/50; G02B 6/508; G02B 6/545
See application file for complete search history.

(56) References Cited

U.S. PATENT DOCUMENTS 5,480,203 A * 1/1996 Favalora ................. B25B 25/00
24/115 N
12,204,160 B2 * 1/2025 Mitobe .................... G02B 6/54
(Continued)

FOREIGN PATENT DOCUMENTS

EP 2 416 196 A1 2/2012
JP S63-125903 A 5/1988
(Continued)

OTHER PUBLICATIONS

English Translation for JP-H09230186-A, 6 pages (Year: 1997).*

*Primary Examiner* — Daniel Petkovsek
(74) *Attorney, Agent, or Firm* — Oliff PLC

(57) ABSTRACT

A optical cable member includes an optical cable, a fixing member, a first housing tube, and a second housing tube. The optical cable includes an optical fiber and a tensile strength member. In the optical cable, a cable main body housing the optical fiber and the tensile strength member, and a cable exposure portion in which the optical fiber and the tensile strength member are exposed to an outside are provided. The fixing member fixes the tensile strength member. The first housing tube is disposed between the fixing member and the cable main body, houses the tensile strength member therein, and allows the optical fiber to extend therein. The second housing tube is disposed on a side opposite to the first
(Continued)

housing tube of the fixing member, and houses the optical fiber of the cable exposure portion therein. The second housing tube is a bendable member.

26 Claims, 12 Drawing Sheets

(51) Int. Cl.
*G02B 6/46* (2006.01)
*G02B 6/50* (2006.01)

(56) References Cited

U.S. PATENT DOCUMENTS

| | | | | |
|---|---|---|---|---|
| 2012/0308184 | A1* | 12/2012 | Pina | G02B 6/545 385/102 |
| 2020/0150367 | A1* | 5/2020 | Scarpaci | G02B 6/4434 |

FOREIGN PATENT DOCUMENTS

| | | | | | |
|---|---|---|---|---|---|
| JP | S63-206708 | A | | 8/1988 | |
| JP | 109-230186 | A | | 9/1997 | |
| JP | H09230186 | A | * | 9/1997 | G02B 6/50 |
| JP | H09-297224 | A | | 11/1997 | |
| JP | 2001-004888 | A | | 1/2001 | |
| JP | 2001-004889 | A | | 1/2001 | |
| JP | 2001-327023 | A | | 11/2001 | |

* cited by examiner

OPTICAL CABLE MEMBER, TOWING MEMBER, AND TOWING METHOD

TECHNICAL FIELD

The present disclosure relates to an optical cable member, a towing member, and a towing method. The present application claims priority based on Japanese Patent Application No. 2020-142575 filed on Aug. 26, 2020, the entire contents of which are incorporated herein by reference.

BACKGROUND ART

Patent Literature 1 and Patent Literature 2 disclose an optical cable towing tool attached to one end of an optical cable in which a large number of optical fibers are housed. In the optical cable towing tool, a high-tension hose is provided outside a connection structure for fixing a tension member exposed from an optical cable and an optical fiber exposed from the optical cable, to thereby protect the connection structure and the optical fiber disposed inside the high-tension hose.

CITATION LIST

Patent Literature

Patent Literature 1: Japanese Unexamined Patent Publication No. 2001-004888
Patent Literature 2: Japanese Unexamined Patent Publication No. 2001-004889

SUMMARY OF INVENTION

The present disclosure provides, as one aspect, an optical cable member. The optical cable member includes an optical cable, a fixing member, a first housing tube, and a second housing tube. The optical cable includes an optical fiber and a tensile strength member each extending in a longitudinal direction. In the optical cable, a cable main body housing the optical fiber and the tensile strength member, and a cable exposure portion in which the optical fiber and the tensile strength member are exposed to an outside are provided along the longitudinal direction. The fixing member fixes the tensile strength member of the cable exposure portion. The first housing tube is disposed between the fixing member and the cable main body, houses the tensile strength member of the cable exposure portion therein, and allows the optical fiber of the cable exposure portion to extend therein. The second housing tube is disposed on a side opposite to the first housing tube of the fixing member in the longitudinal direction, and houses the optical fiber of the cable exposure portion therein. In the optical cable member, the second housing tube is a bendable member.

As another aspect, the present disclosure provides a towing member for towing an optical cable including an optical fiber and a tensile strength member. The towing member includes a fixing member configured to fix the tensile strength member of the optical cable, a first housing tube attached to a first end of the fixing member, and a second housing tube attached to a second end of the fixing member on a side opposite to the first end. In the towing member, the second housing tube is a bendable member.

As still another aspect, the present disclosure relates to a method of towing an optical cable using the optical cable member. This towing method includes passing the optical cable through a laying tube, and removing the second housing tube of the optical cable from the fixing member after passing through the laying tube to expose a distal end portion of the optical fiber.

DESCRIPTION OF EMBODIMENTS

Figure 1:
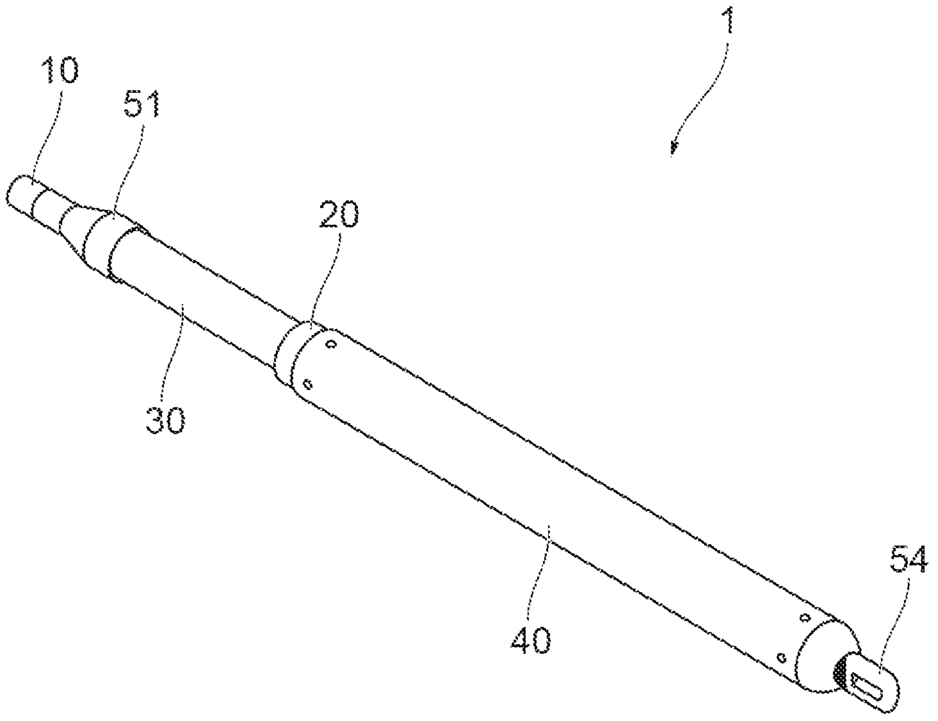
FIG. 1 is a perspective view illustrating an optical cable member according to one embodiment.

Problem to be Solved by Present Disclosure

In the optical cable towing tool disclosed in Patent Literature 1 or the like, the outer diameter tends to be large because the high-tension hose covers up to a cable fixing portion. Although the internal structure can be protected, it may be difficult to move when the optical cable is inserted into a laying tube and towed. For example, in a case where the laying tube is thin, in a case where another cable is already laid in the laying tube, or in a case where the laying tube is bent on the way, with the optical cable towing tool disclosed in Patent Literature 1 or the like, the optical cable may be caught in the middle, and towing work may not be smoothly performed.

Effect of Present Disclosure

According to the present disclosure, it is possible to smoothly perform towing work when laying an optical cable.

Description of Embodiments of Present Disclosure

First, contents of embodiments of the present disclosure will be listed and described. An optical cable member according to one embodiment of the present disclosure includes an optical cable, a fixing member, a first housing tube, and a second housing tube. The optical cable includes an optical fiber and a tensile strength member each extending in a longitudinal direction. In the optical cable, a cable main body housing the optical fiber and the tensile strength member, and a cable exposure portion in which the optical fiber and the tensile strength member are exposed to an outside are provided along the longitudinal direction. The fixing member fixes the tensile strength member of the cable exposure portion. The first housing tube is disposed between the fixing member and the cable main body, houses the tensile strength member of the cable exposure portion therein, and allows the optical fiber of the cable exposure portion to extend therein. The second housing tube is disposed on a side opposite to the first housing tube of the fixing member in the longitudinal direction, and houses the optical fiber of the cable exposure portion therein. In the optical cable member, the second housing tube is a bendable member.

A towing member according to one embodiment of the present disclosure is a towing member for towing an optical cable including an optical fiber and a tensile strength member. The towing member includes a fixing member configured to fix the tensile strength member of the optical cable, a first housing tube attached to a first end of the fixing member, and a second housing tube attached to a second end of the fixing member on a side opposite to the first end. In the towing member, the second housing tube is a bendable member.

A towing method according to one embodiment of the present disclosure is a method of towing an optical cable using the above-described cable member. The towing method includes passing the optical cable through a facility tube, and removing the second housing tube of the optical cable from the fixing member after passing through the facility tube to expose a distal end portion of the optical fiber.

In the optical cable member or the towing member described above, the second housing tube that is located on the distal end side and houses the optical fiber is a bendable member. For this reason, in a case where the optical cable is introduced into the laying tube by attaching a wire or the like to the distal end of the optical cable member, even if the laying tube is narrow or the laying tube is bent, the second housing tube can be smoothly moved by bending as necessary at the time of towing work. Therefore, with the optical cable member, the towing member, and the towing method described above, it is possible to smoothly perform the towing work when laying the optical cable.

As one embodiment, the first housing tube may be a bendable member, and a minimum bending radius of the first housing tube may be smaller than a minimum bending radius of the optical cable. In this case, the first housing tube near the optical cable can also be bent as necessary according to the laying tube. A minimum bending radius of the second housing tube may be smaller than the minimum bending radius of the optical cable. The minimum bending radius of the first housing tube may be, for example, equal to or more than 300 mm and equal to or less than 500 mm, and the minimum bending radius of the second housing tube may be, for example, equal to or more than 200 mm and equal to or less than 500 mm. Note that the "minimum bending radius" used here means, in the optical cable, a radius to the extent that the optical characteristics of the optical fiber housed inside are maintained, and means, in the housing tube, a radius to the extent that the accommodation tube is not broken even when it is bent, and means a bending radius in the central axis of the member in each case.

As one embodiment, the first housing tube may have an outer diameter smaller than the outer diameter of the second housing tube. The first housing tube may have an outer diameter smaller than twice the outer diameter of the cable main body. In this case, the first housing tube near the optical cable can be made thinner close to the outer diameter of the optical cable, and can be handled as one substantially similar to the optical cable when the first housing tube is inserted into the laying tube and towing work is performed. Consequently, it is possible to more smoothly perform the towing work when laying the optical cable.

As one embodiment, the second housing tube may have a length equal to or more than three times the length of the first housing tube. In this case, even when an optical cable having an exposed optical fiber with a sufficient length is inserted into the laying tube, it is possible to smoothly perform towing work of the optical cable in the laying tube. Note that the optical cable member having the exposed optical fiber with a sufficient length facilitates attachment of the optical fiber to the optical apparatus after the towing work, optical wiring, and the like.

As one embodiment, the fixing member may include a pin fixing a distal end of the tensile strength member of the cable exposure portion, and a fixing main body located between the first housing tube and the second housing tube. The fixing main body includes a first attachment portion to which the first housing tube is attached and a second attachment portion to which the second housing tube is attached, in which the pin is attachable from the side of the first attachment portion. The fixing main body may be provided with at least one through hole extending along the longitudinal direction, and the optical fiber of the cable exposure portion may extend from the first housing tube to the second housing tube through the through hole. In this case, the configuration for fixing the tensile strength member and the configuration for passing the optical fiber therethrough can be simplified. Further, fixing work of the tensile strength member can be easily performed.

As one embodiment, the optical cable member may further include a coupling member attached to the distal end of the second housing tube. The coupling member, the second housing tube, and the fixing member may be configured to transmit a tensile force applied to the coupling member to the tensile strength member via the second housing tube and the fixing member. In this case, even if a twist caused by tension is applied to the second housing tube and the like during the towing work, the tensile force or the twist is directly transmitted to the tensile strength member instead of from the outside of the optical cable, so that it is possible to suppress pulling or twisting of the optical cable itself. Consequently, it is possible to prevent unnecessarily tension, twist, deformation, or the like, of the optical fiber in the optical cable from being generated and deteriorating optical transmission characteristics.

As one embodiment, an optical connector may be attached to a distal end of the optical fiber of the cable exposure portion, and the optical connector may be housed in the second housing tube. The second housing tube may be attached to the fixing member so as to be detachable from the fixing member. In this case, when the optical cable member is moved in the laying tube and reaches the target place, the optical connector required for the subsequent work can be easily taken out by detaching the second housing tube, and the operation efficiency can be improved.

As one embodiment, at least one of a first outer peripheral region where the first housing tube is fixed to the fixing member and a second outer peripheral region where the second housing tube is fixed to the fixing member may be covered with a waterproof tape. In this case, it is possible to more reliably prevent moisture or the like from entering the optical cable.

Details of Embodiments of Present Disclosure

Hereinafter, one embodiment of the present disclosure will be described in detail with reference to the accompanying drawings. The present invention is not limited to these examples, but is indicated by the claims, and is intended to include all the modifications within the meanings and the scope equivalent to the claims. In the following description, the same reference numerals will be used for the same elements or elements having the same functions, and redundant description will be omitted.

Figure 2:
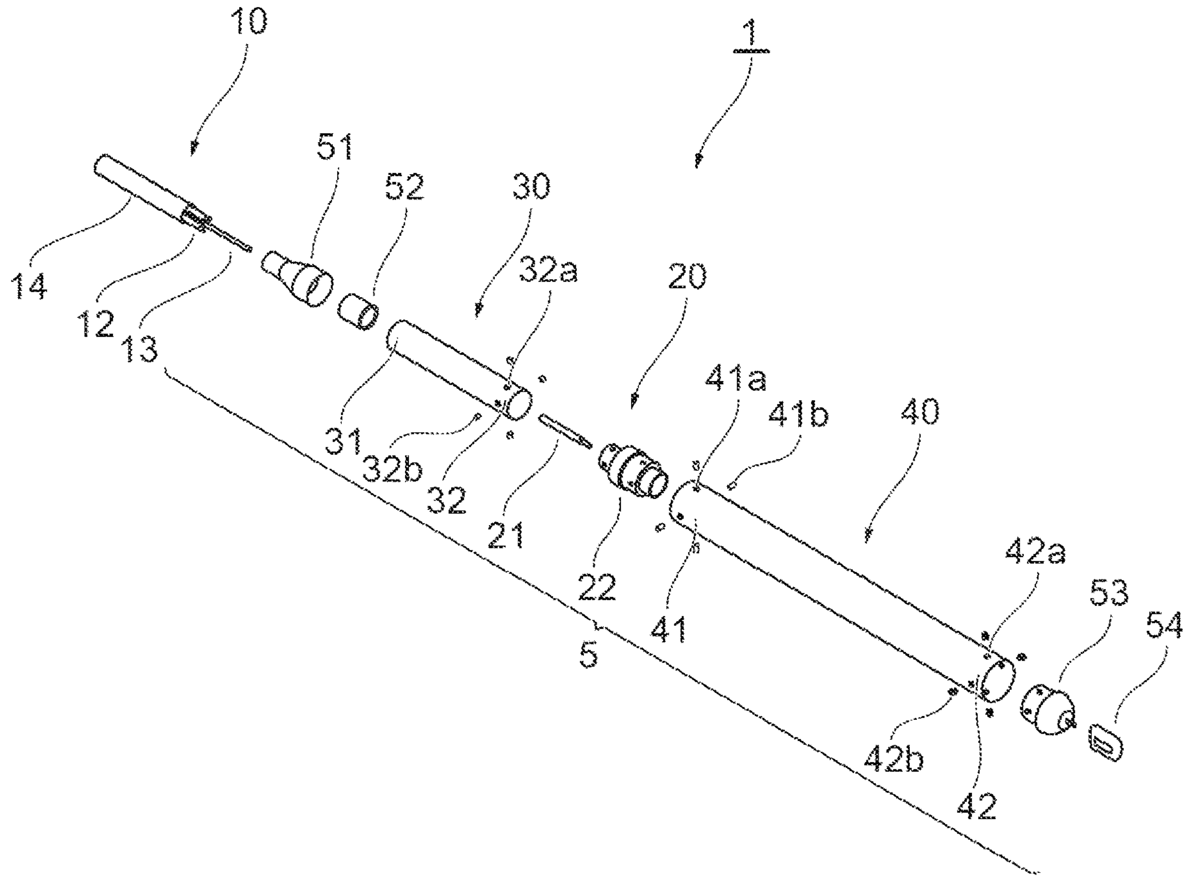
FIG. 2 is an exploded perspective view of the optical cable member illustrated in FIG. 1.

An example of an optical cable member according to the present embodiment will be described with reference to FIGS. 1 and 2. FIG. 1 is a perspective view illustrating an optical cable member 1. FIG. 2 is an exploded perspective view of the optical cable member 1. As illustrated in FIGS. 1 and 2, the optical cable member 1 includes an optical cable 10, a fixing member 20, a first housing tube 30, a second housing tube 40, cable fittings 51 and 52, a lid 53, and a coupling member 54. In FIGS. 1 and 2, only one end portion of the optical cable 10 is illustrated, and description of other portions is omitted. The optical cable member 1 is a member for inserting the optical cable 10 into a laying tube 60 and towing the optical cable 10 to a predetermined position by a wire 56 connected to the coupling member 54 (see FIG. 11). A distal end portion (optical connector 16) of the optical cable 10 towed to the predetermined position is optically connected to a predetermined apparatus or the like. As an example, the optical cable member 1 including the optical cable 10 is used to optically connect data centers. Hereinafter, the configuration of the optical cable member 1 on one end of the optical cable 10 will be described, but a similar configuration may be provided on the other end of the optical cable 10. Note that a component of the optical cable member 1 excluding the optical cable 10 is a towing member 5. That is, the towing member 5 includes the fixing member 20, the first housing tube 30, the second housing tube 40, the cable fittings 51 and 52, the lid 53, and the coupling member 54.

Figure 3:
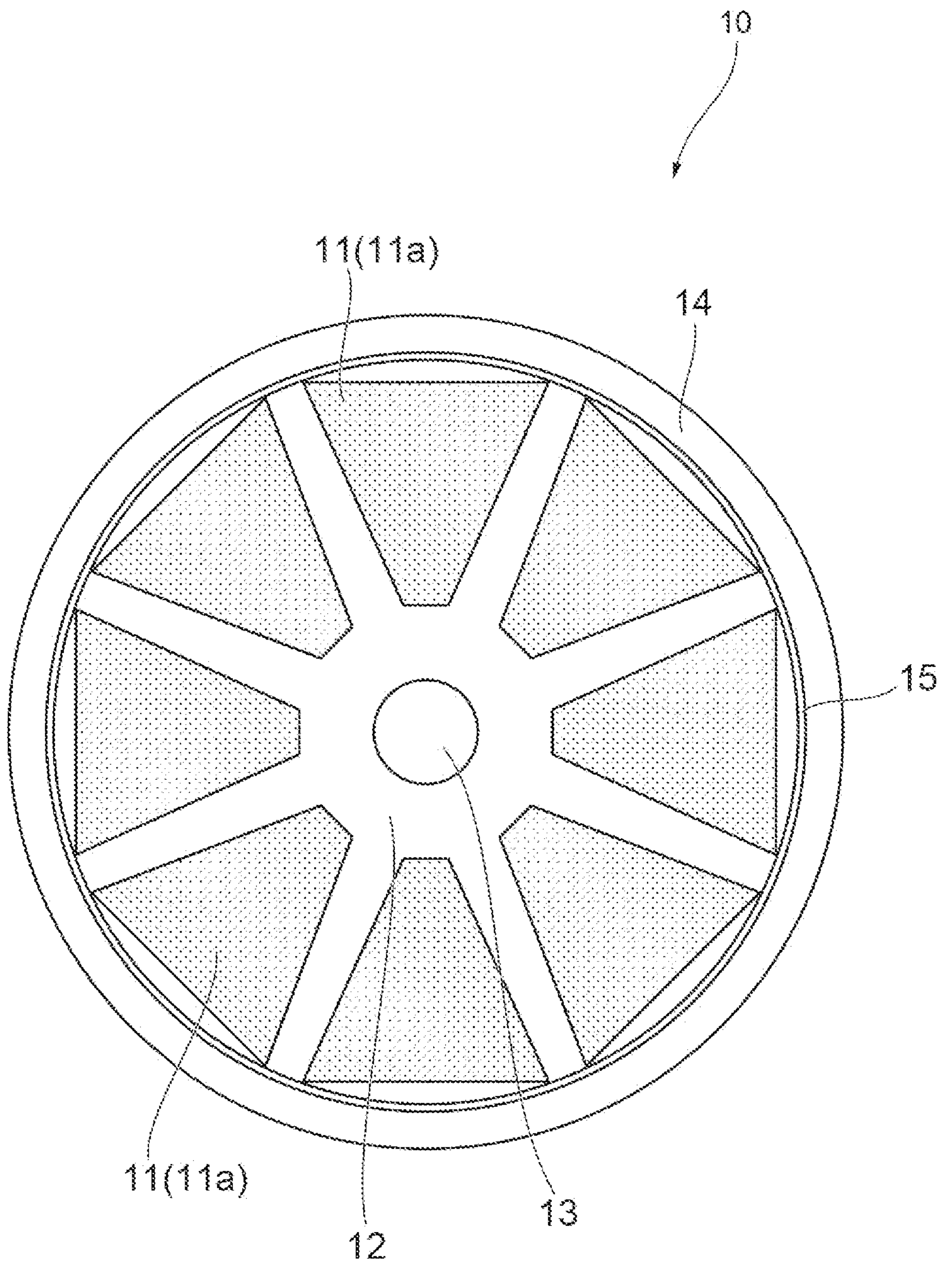
FIG. 3 is a cross-sectional view illustrating an example of an optical cable of the optical cable member.
Figure 4:
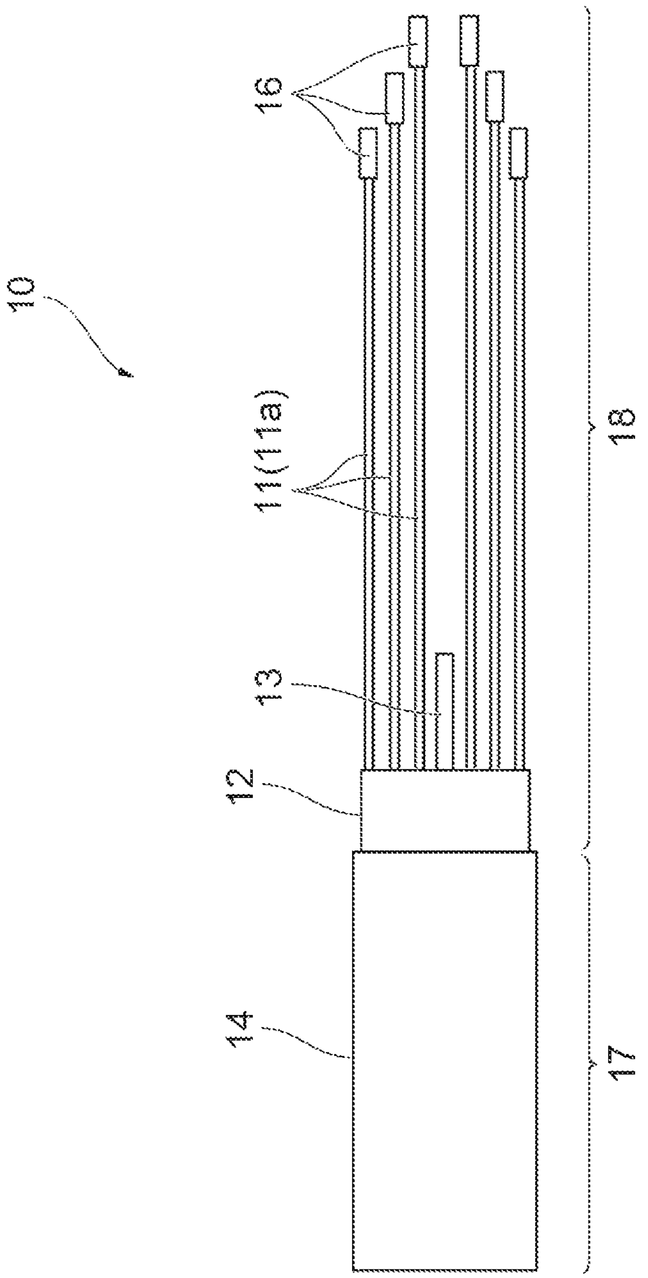
FIG. 4 is a side view schematically illustrating the optical cable illustrated in FIG. 3.

As illustrated in FIGS. 3 and 4, the optical cable 10 includes a fiber unit 11 in which a large number of optical fibers 11*a* are bundled, a spacer 12, a tensile strength member 13, a sheath 14, and a water absorption tape 15. The fiber units 11, the spacer 12, the tensile strength member 13, the sheath 14, and the like each extend in the longitudinal direction (direction orthogonal to the paper surface of FIG. 3). The length along the longitudinal direction of the optical cable 10 can be, for example, equal to or more than 0.5 km and equal to or less than 3.0 km. The optical cable 10 is provided with, for example, a plurality of fiber units 11 (eight fiber units 11 in the example of the present embodiment), and a large number of optical fibers 11*a* are housed in each fiber unit 11. For example, in a case where the optical cable 10 is used for a data center, the total number of optical fibers 11*a* of 1000 or more may be included, for example, 1728 or 3456 optical fibers 11*a* may be included, and the large number of optical fibers 11*a* are separately housed in each fiber unit 11.

The spacer 12 is a member extending in the longitudinal direction together with the fiber units 11 to align the fiber units 11, and has a plurality of projections (star shaped) projecting from the inside to the outside in a radial direction orthogonal to the longitudinal direction. Each fiber unit 11 is housed in each groove defined by a pair of adjacent projections of the spacer 12. The spacer 12 is formed of, for example, a resin such as polyethylene resin. A round bar-shaped tensile strength member 13 is embedded in the center of the spacer 12, and is integrated with the spacer 12. The tensile strength member 13 is a member for receiving an external load (tension, torsion, or the like) applied to the optical cable 10, and extends in the longitudinal direction together with the fiber unit 11 and the spacer 12. The external load applied to the optical fibers 11*a* of the fiber unit 11, the spacer 12, and the like is reduced and protected by the tensile strength members 13. The tensile strength member 13 is formed of metal (for example, steel), fiber-reinforced plastic (FRP), or the like, for example. The tensile strength members 13 may be provided separately from the spacers 12, or may be provided in or outside the grooves of the spacers 12.

The sheath 14 is a portion that houses the plurality of fiber units 11, the spacer 12, and the tensile strength member 13 inside and protects these members from a load from the outside in the radial direction and an intruding object (for example, water), and is formed of, for example, resin or the like. The water absorption tape 15 is a tape for absorbing moisture that has entered the optical cable 10. The water absorption tape 15 is disposed between the fiber units 11 and the sheath 14, and protects the optical fibers 11*a* of the fiber units 11 from moisture and the like.

In the optical cable 10 having the above-described configuration, as illustrated in FIG. 4, a cable main body 17 in which the fiber units 11 (optical fibers 11*a*), the spacer 12, and the tensile strength member 13 are housed in the sheath 14, and a cable exposure portion 18 from which the sheath 14 is removed and from which the fiber units 11 (optical fibers 11*a*), the spacer 12, and the tensile strength member 13 are exposed to the outside are provided. In the cable exposure portion 18, the tensile strength member 13 is exposed so as to project from the end portion of the sheath 14, and the fiber units 11 are exposed so as to project further from the sheath 14 than the tensile strength member 13. That is, the exposed fiber units 11 are longer than the exposed tensile strength member 13.

An optical connector 16 is attached to an exposed distal end of each fiber unit 11. As an example, the optical connector 16 is an MPO connector corresponding to 12 fibers or 24 fibers. The optical connectors 16 are housed in the second housing tube 40, but may be connected to the fiber units 11 (optical fibers 11*a*) so as to have different positions in the longitudinal direction (with steps) in order to efficiently utilize the space in the second housing tube 40. That is, the optical connectors 16 may be attached such that the lengths of the exposed portions of the respective fiber units 11 (optical fibers 11*a*) are different to be steps.

Figure 5:
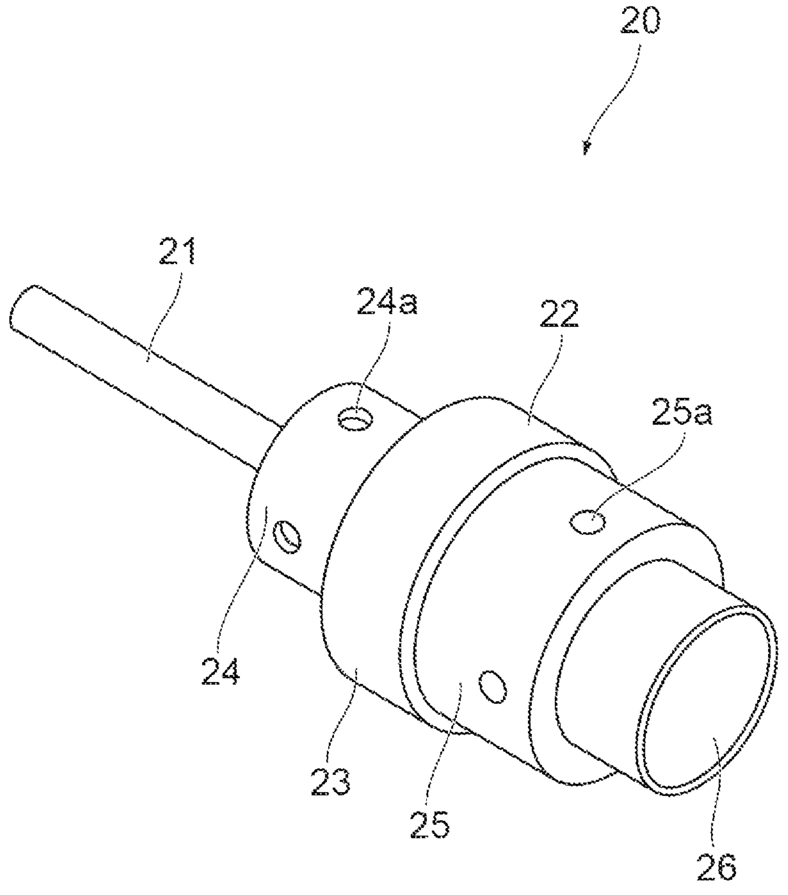
FIG. 5 is a perspective view illustrating an example of a fixing member of the optical cable member.
Figure 6:
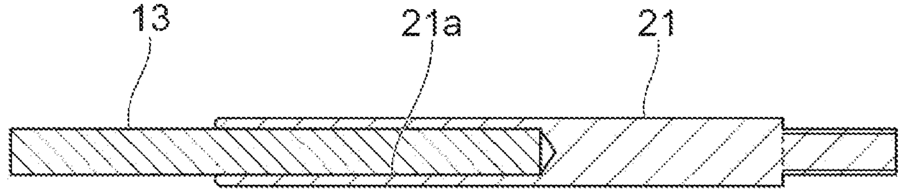
FIG. 6 is a cross-sectional view illustrating a state in which a tensile strength member of the optical cable is fixed to a pin of the fixing member.
Figure 7:
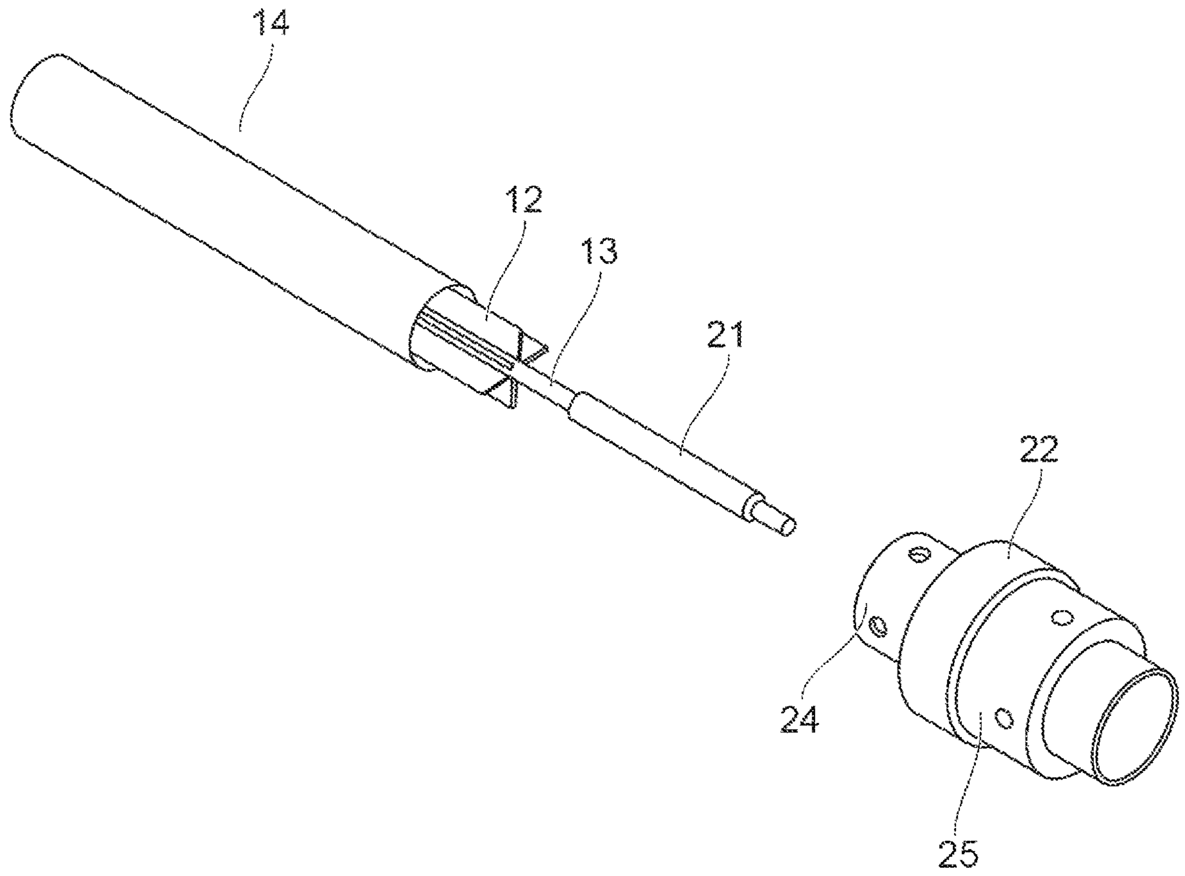
FIG. 7 is a perspective view illustrating an example in which the optical cable is attached to the fixing member.

As illustrated in FIG. 2, the fixing member 20 is a member that fixes one end of the tensile strength member 13 of the cable exposure portion 18, is disposed between the first housing tube 30 and the second housing tube 40, and is attached to each of the first housing tube 30 and the second housing tube 40. As illustrated in FIGS. 2 and 5, the fixing member 20 includes a pin 21 and a fixing main body 22. Each of the pin 21 and the fixing main body 22 is formed of metal. The fixing member 20 is configured so that a tip of the pin 21 can be inserted into the fixing main body 22. As illustrated in FIG. 6, the pin 21 is a round bar member having an inner hole 21*a*, and fixes the distal end of the tensile strength member 13 inserted into the inner hole 21*a* by swaging and/or an adhesive, thereby fixing the exposed end portion of the tensile strength member 13 of the optical cable 10 to the fixing member 20. As illustrated in FIG. 7, the tensile strength member 13 is fixed to the pin 21 and then fixed to the fixing main body 22.

As illustrated in FIG. 5, the fixing main body 22 includes a cylindrical central portion 23, a first attachment portion 24 on the first housing tube 30 side of the central portion 23, and a second attachment portion 25 on the second housing tube 40 side of the central portion 23. The first attachment portion 24 and the second attachment portion 25 similarly have a cylindrical shape, but are formed to have an outer diameter smaller than that of the central portion 23. A second end 32 of the first housing tube 30 is attached to the first attachment portion 24, and a first end 41 of the second housing tube 40 is attached to the second attachment portion 25. More specifically, the second end 32 of the first housing tube 30 is detachably fixed to the first attachment portion 24 by aligning the through holes 32*a* of the second end 32 of the first housing tube 30 with screw holes 24*a* (four screw holes 24*a* in the example of the present embodiment) provided at even intervals on the outer periphery of the first attachment portion 24 and fastening them with screws 32*b*. Similarly, the first end 41 of the second housing tube 40 is detachably fixed to the second attachment portion 25 by aligning the through holes 41*a* of the first end 41 of the second housing tube 40 with screw holes 25*a* (four screw holes 25*a* in the example of the present embodiment) provided at even intervals on the outer periphery of the second attachment portion 25 and fastening them with screws 41*b*. A waterproof tape 55 may be attached to the outer periphery (the first outer peripheral region and the second outer peripheral region) of the fixing member 20 to which the first housing tube 30 and the second housing tube 40 are fixed (see FIG. 11).

Figure 8:
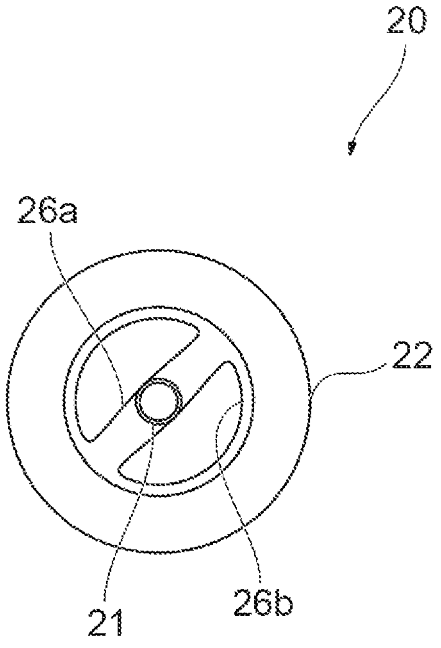
FIG. 8 is a plan view of the fixing member illustrated in FIG. 5 as viewed from the optical cable side.

As illustrated in FIG. 5, a through hole 26 is provided inside the fixing main body 22 of the fixing member 20. The fiber units 11 (optical fibers 11*a*) of the cable exposure portion 18 extend from the first housing tube 30 to the second housing tube 40 through the through hole 26. As illustrated in FIG. 8, the through hole 26 is divided into a pair of through holes 26*a* and 26*b* around the first housing tube 30, and the pin 21 is fixed to the central portion thereof.

Figure 9:
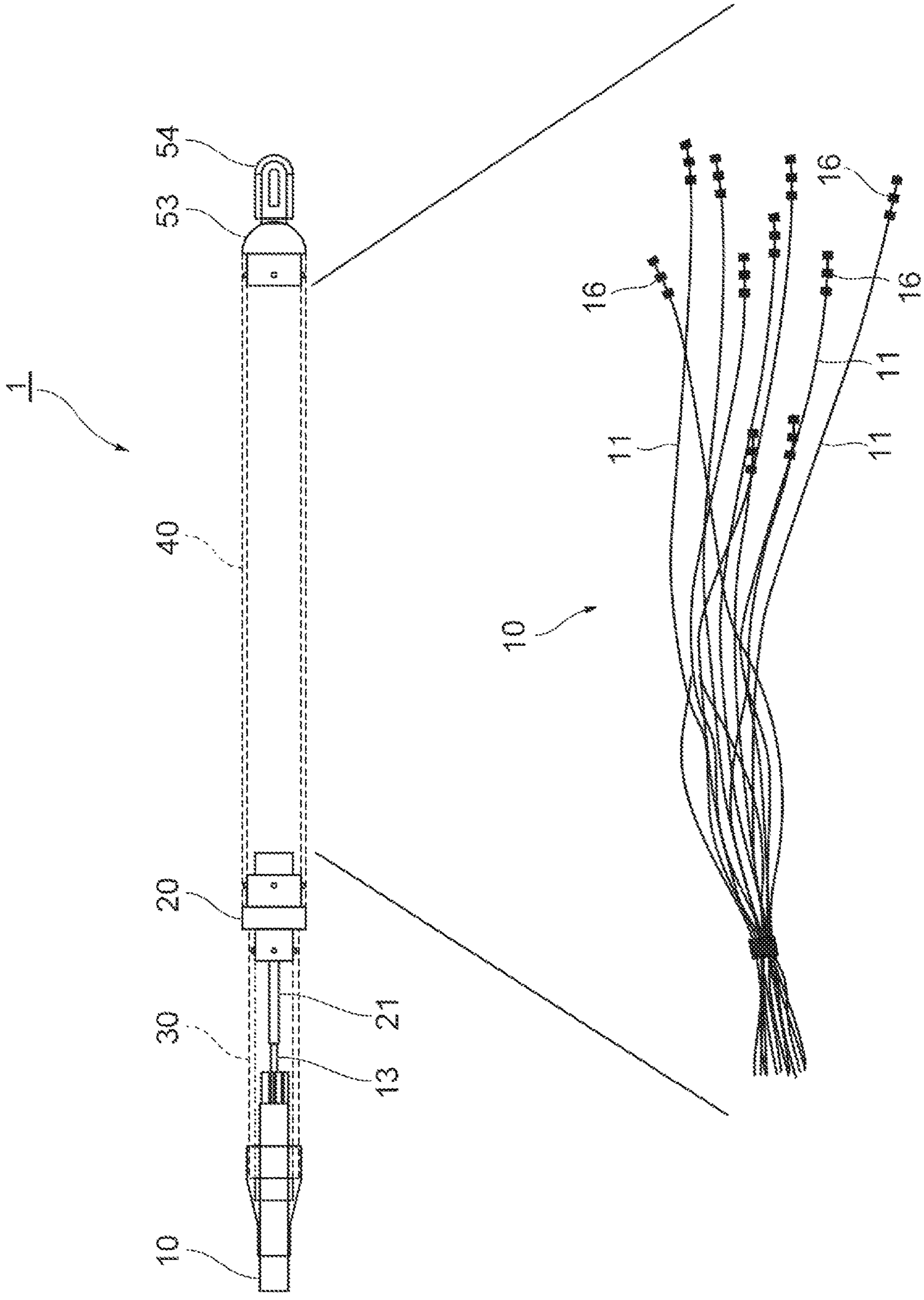
FIG. 9 is a schematic side view illustrating insides of a first housing tube and a second housing tube of the optical cable member, and illustrates an example of a large number of optical fibers housed in the second housing tube in an enlarged manner.

As illustrated in FIGS. 1 and 2, the first housing tube 30 is a tubular member disposed between the fixing member 20 and the cable main body 17 of the optical cable 10. A first end 31 is attached to the cable main body 17 of the optical cable 10 by the cable fittings 51 and 52, and the second end 32 is attached to the fixing member 20 by screws or the like as described above. As illustrated in FIG. 9, the first housing tube 30 houses the tensile strength member 13 of the cable exposure portion 18 therein, and allows the fiber units 11 (optical fiber 11*a*) of the cable exposure portion 18 to extend therein. Although not illustrated in FIG. 9, the fiber units 11 in the first housing tube 30 are disposed radially outside the tensile strength member 13 and the pins 21 and extends toward the second housing tube 40. The tensile strength member 13 is fixed to the pin 21 of the fixing member 20 in the first housing tube 30, for example. As described above, the fiber units 11 (optical fibers 11*a*) extend so as to be drawn from the first housing tube 30 to the second housing tube 40 via the through hole 26 of the fixing member 20. The first housing tube 30 is formed to have side pressure resistance in order to protect the fiber units 11, the spacer 12, the tensile strength member 13, the pin 21 of the fixing member 20, and the like housed therein from pressure from the outside in the radial direction. As the "side pressure resistance" of the first housing tube 30, for example, it is preferable to have strength such that the first housing tube is not damaged even when a force of 1000 N is applied in the range of a length of 30 cm, and it is more preferable that the first housing tube is not damaged even when a force of 1500 N is applied.

Figure 10:
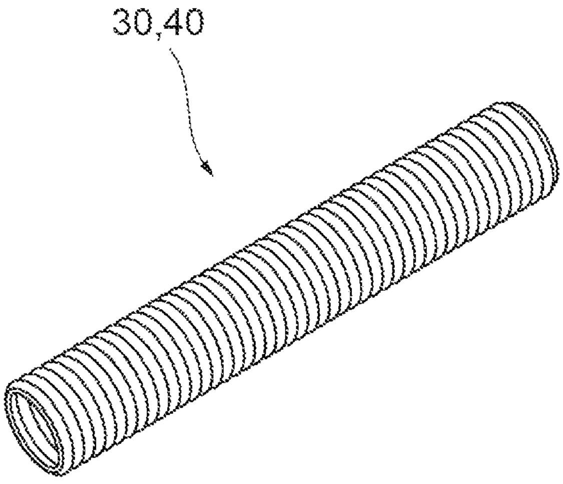
FIG. 10 is a perspective view illustrating an example of a metal flexible tube used for the first housing tube and the second housing tube of the optical cable member.

On the other hand, the first housing tube 30 is formed to be bendable, and for example, as illustrated in FIG. 10, is formed by a metal flexible hose which is a hose in which metal or the like is meshed so as to be bendable. The first housing tube 30 may be a flexible hose other than metal as long as it has predetermined side pressure resistance. The first housing tube 30 is preferably one that is not damaged even by bending while being towed at 1000 N, and more preferably one that is not damaged even by bending while being towed at 1200 N. The minimum bending radius of the first housing tube 30 may be smaller than the minimum bending radius of the optical cable 10. The "minimum bending radius" used here means, in the optical cable, a radius to the extent that the optical characteristics of the optical fiber housed inside are maintained, and means, in the housing tube, a radius to the extent that the accommodation tube is not broken even when it is bent, and means a bending radius in the central axis of the member in each of them. Since the first housing tube 30 has an outer diameter larger than that of the optical cable 10 and there is a space between the first housing tube 30 and the optical cable 10, even when the first housing tube 30 is bent, bending applied to the optical cable 10 housed therein is usually gentler. Thus, the minimum bending radius of the first housing tube 30 can be made smaller than the minimum bending radius of the optical cable 10. On the other hand, the smaller the minimum bending radius of the first housing tube 30 is, the easier it is to pass through the inside of a conduit line, and the better the towing characteristic becomes. For example, when the minimum bending radius (mm) of the optical cable 10 is R450, the minimum bending radius of the first housing tube 30 is, for example, equal to or more than R300 and equal to or less than R500 (equal to or more than 300 mm and equal to or less than 500 mm), and more preferably equal to or more than R300 and equal to or less than R400 (equal to or more than 300 mm and equal to or less than 400 mm). In addition, the first housing tube 30 preferably has an outer diameter smaller than the outer diameter of the second housing tube 40 and preferably has an outer diameter smaller than twice the outer diameter of the cable main body 17 so that the first housing tube can be handled in a substantially similar manner to that of the optical cable 10. However, the outer diameter of the first housing tube 30 may be the same as the outer diameter of the second housing tube 40. Length of the first housing tube 30 in the longitudinal direction may be, for example, equal to or more than 20 cm and equal to or less than 40 cm, and may be shorter than that of the second housing tube 40.

As illustrated in FIGS. 1 and 2, the second housing tube 40 is a cylindrical protective member disposed on the opposite side of the fixing member 20 from the first housing tube 30 in the longitudinal direction. As described above, the first end 41 is attached to the fixing member 20 with screws or the like, and similarly, a second end 42 is attached to the lid 53 with through holes 42*a*, screws 42*b*, or the like. As illustrated in FIG. 9, the second housing tube 40 houses the fiber units 11 (optical fibers 11*a*) of the cable exposure portion 18 therein. In the second housing tube 40, the optical connectors 16 are attached to the distal ends of the fiber units 11, and the fiber units 11 with the optical connectors 16 are housed in the second housing tube 40 in a stepped form. That is, the fiber units 11 are housed such that the positions of the respective optical connectors 16 are shifted in the longitudinal direction. However, the positions of all the optical connectors 16 do not need to be shifted from each other. The fiber units 11 housed in the second housing tube 40 are held in a state of being packed in the second housing tube 40 without being fixed thereto, but may be fixed to the second housing tube 40.

The second housing tube 40 is formed by, for example, a metal tube so as to have side pressure resistance for protecting the fiber unit 11 and the like housed inside from external pressure and resistance to bending tensile force generated at the time of towing. The second housing tube 40 is also formed to be bendable, and is formed by, for example, a metal flexible hose illustrated in FIG. 10. It is preferable that the second housing tube 40 is not damaged even when it is bent while being towed at 1000 N. As the side pressure resistance, for example, it is preferable to have strength so as not to be damaged even when a force of 1000 N is applied in the range of a length of 30 cm, and it is more preferable that it is not damaged even when a force of 1500 N is applied. The minimum bending radius of the second housing tube 40 may be smaller than the minimum bending radius of the optical cable 10. The fiber units 11 (optical fibers 11*a*) and the optical connectors 16 attached to the distal ends thereof are housed in the second housing tube 40. Since there is a space between the second housing tube 40 and the fiber units 11 (the optical fibers 11*a*) and the optical connectors 16 attached to the distal ends thereof, the minimum bending radius of the second housing tube 40 can be set smaller than the minimum bending radius of the optical cable 10. The smaller the minimum bending radius of the second housing tube 40 is, the easier it is to pass through the inside of a conduit line, and the better the towing characteristic becomes. When the minimum bending radius (mm) of the optical cable 10 is R450, the minimum bending radius (mm) of the second housing tube 40 is, for example, equal to or more than 8200 and equal to or less than R500 (equal to or more than 200 mm and equal to or less than 500 mm), and more preferably equal to or more than R300 and equal to or less than R450 (equal to or more than 300 mm and equal to or less than 450 mm).

The second housing tube 40 has an outer diameter larger than the outer diameter of the first housing tube 30 in order to house the fiber units 11 to which the optical connectors 16 are attached. The outer diameter of the second housing tube 40 may be the same as the outer diameter of the first housing tube 30. Length of the second housing tube 40 in the longitudinal direction may be, for example, equal to or more than 1 m and equal to or less than 5 m, and may have a length equal to or more than three times the length of the first housing tube 30. With such length, when the fiber units 11 are installed in the optical apparatus after towing, installation can be facilitated and appropriate wiring can be obtained. Since the second housing tube 40 is attached to the fixing member 20 with screws or the like, the second housing tube 40 can be easily detached from the fixing member 20 after towing.

As illustrated in FIGS. 1 and 2, the second end 42 of the second housing tube 40 is further provided with the coupling member 54 via the lid 53. The coupling member 54 is provided with an opening for attaching the wire 56 used for towing the optical cable member 1, and the optical cable member 1 can be towed by hooking the wire 56 to the opening and towing the wire in a predetermined direction.

Figure 11:
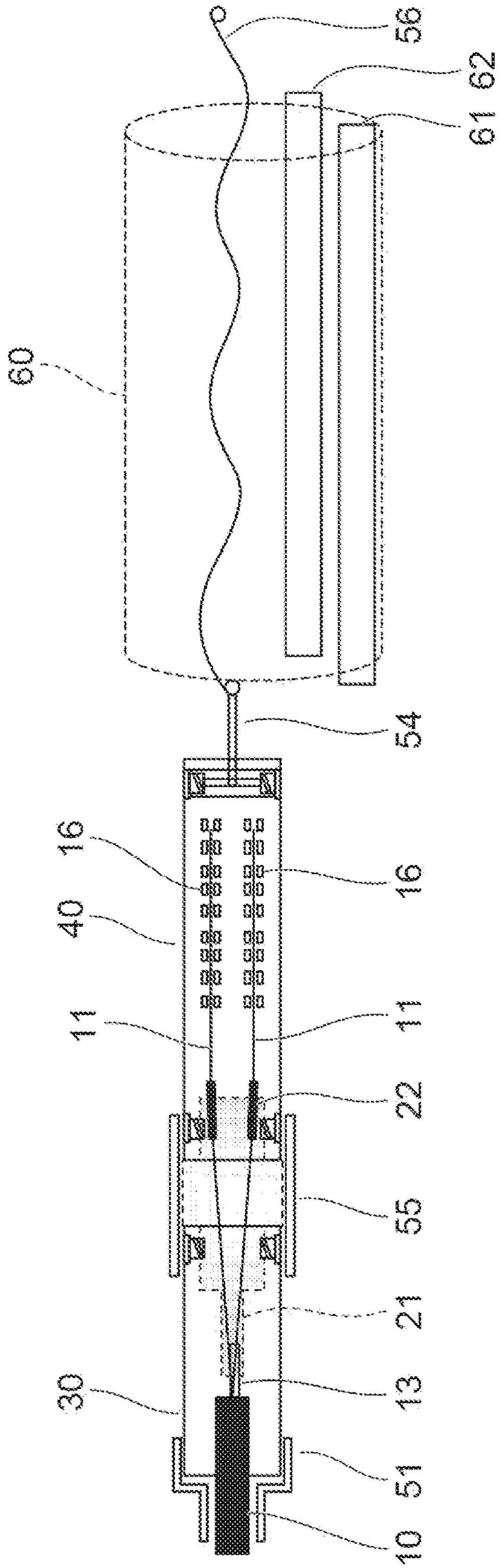
FIG. 11 is a view for describing an outline of a method of inserting the optical cable member into a laying tube and towing the optical cable member.

Here, with reference to FIG. 11, a method of towing the optical cable member 1 having the above configuration and an operation effect at that time will be described. As illustrated in FIG. 11, for example, other cables 61 and 62 may already be laid in the laying tube 60. In addition, the laying tube 60 may be thin or bent. In the case of the conventional optical cable member (towing member), since the outer cylinder is hard and does not bend, the towed optical cable is caught on the way, and the towing work may not be smoothly performed. In contrast, when the optical cable 10 is towed using the optical cable member 1 according to the present embodiment, first, the optical cable 10 is passed through the laying tube 60 by attaching the wire 56 or the like to the distal end of the optical cable member 1. At this time, at least the second housing tube 40 positioned on the distal end side of the optical cable member 1 and housing the fiber units 11 (optical fibers 11*a*) is a bendable member. Therefore, even if the inside of the laying tube 60 is narrow or the laying tube 60 is bent, the second housing tube 40 on the head side can move smoothly by bending as necessary at the time of towing work. After the optical cable 10 is towed to a predetermined position through the laying tube 60, the second housing tube 40 of the optical cable member 1 is removed from the fixing member 20, and the distal end portions (including the optical connectors 16 and the like) of the optical fibers 11*a* are exposed and provided for a predetermined connection. As described above, with the optical cable member 1, it is possible to smoothly perform the towing work when laying the optical cable 10.

In the present embodiment, the first housing tube 30 may be a further bendable member. In this case, the first housing tube 30 near the optical cable 10 can also be bent as necessary according to the shape and size of the laying tube 60. In the present embodiment, the minimum bending radius of the first housing tube 30 may be smaller than the minimum bending radius of the optical cable 10. In this case, it is possible to more smoothly perform the towing work when laying the optical cable 10.

In the present embodiment, the first housing tube 30 may have an outer diameter smaller than the outer diameter of the second housing tube 40. Alternatively, the first housing tube 30 may have an outer diameter smaller than twice the outer diameter of the cable main body 17. In this case, the first housing tube 30 near the optical cable 10 is made thinner close to the outer diameter of the optical cable 10, and can be handled as one substantially similar to the optical cable 10 when the optical cable is inserted into the laying tube 60 and the towing work is performed. Consequently, it is possible to more smoothly perform the towing work when laying the optical cable 10.

In the present embodiment, the minimum bending radius of the second housing tube 40 may be smaller than the minimum bending radius of the optical cable 10. The second housing tube 40 may have a length equal to or more than three times the length of the first housing tube 30. In this case, even when the optical cable 10 having the exposed optical fiber with a sufficient length is inserted into the laying tube 60, the second housing tube 40 can be appropriately bent, so that the towing work of the optical cable 10 in the laying tube 60 can be smoothly performed. The optical cable member 1 having the exposed optical fiber with a sufficient length facilitates attachment of the optical fiber to the optical apparatus after the towing work, optical wiring, and the like.

In the present embodiment, the fixing member 20 includes the pin 21 that fixes the distal end of the tensile strength member 13 of the cable exposure portion 18, and the fixing main body 22 positioned between the first housing tube 30 and the second housing tube 40. The fixing main body 22 includes the first attachment portion 24 to which the first housing tube 30 is attached and the second attachment portion 25 to which the second housing tube 40 is attached, in which the pin 21 is attachable from the side of the first attachment portion 24. The fixing main body 22 is provided with a through hole 26 extending along the longitudinal direction, and the optical fibers 11*a* of the cable exposure portion 18 extend from the first housing tube 30 to the second housing tube 40 through the through hole 26. In this case, the configuration for fixing the tensile strength member 13 and the configuration for allowing the optical fiber 11*a* to pass through can be simplified. Fixing work of the tensile strength member 13 can be easily performed.

In the present embodiment, the optical cable member 1 may further include the coupling member 54 attached to the second end 42 of the second housing tube 40. The coupling member 54, the second housing tube 40, and the fixing member 20 are configured to transmit a tensile force applied to the coupling member 54 to the tensile strength member 13 via the second housing tube 40 and the fixing member 20. That is, the coupling member 54 is unrotatably fixed to the second end 42 of the second housing tube 40 with screws or the like, and the first end 41 of the second housing tube 40 is unrotatably fixed to the fixing member 20 with screws or the like. Then, the tensile strength member 13 is fixed to the fixing member 20. On the other hand, in the first housing tube 30 in which the second end 32 is fixed to the fixing member 20, the first end 31 is attached to the optical cable 10 (cable main body 17) by the cable fittings 51 and 52. The cable fittings 51 and 52 and the like are, for example, waterproof heat-shrinkable tubes. In this case, even if tension or a twist caused by the tension is applied to the second housing tube 40 and the like during the towing work or the like, the tension or the twist is directly transmitted to the tensile strength member 13 instead of from the outside of the optical cable 10, so that it is possible to suppress pulling or twisting of the optical cable 10 itself. Consequently, it is possible to prevent the optical fiber 11*a* in the optical cable 10 from being damaged by causing unnecessary twisting, deformation due to the twisting, or the like, or from deteriorating the optical transmission characteristics of the optical fiber.

In the present embodiment, the optical connectors 16 are attached to the distal ends of the optical fibers 11*a* of the cable exposure portion 18, and the optical connectors 16 are housed in the second housing tube 40. The second housing tube 40 is attached to the fixing member 20 so as to be detachable from the fixing member 20. Therefore, when the optical cable member 1 is moved in the laying tube 60 and reaches the target place, the optical connector 16 required for the subsequent work can be easily taken out by detaching the second housing tube 40, and the operation efficiency can be improved.

Figure 12:
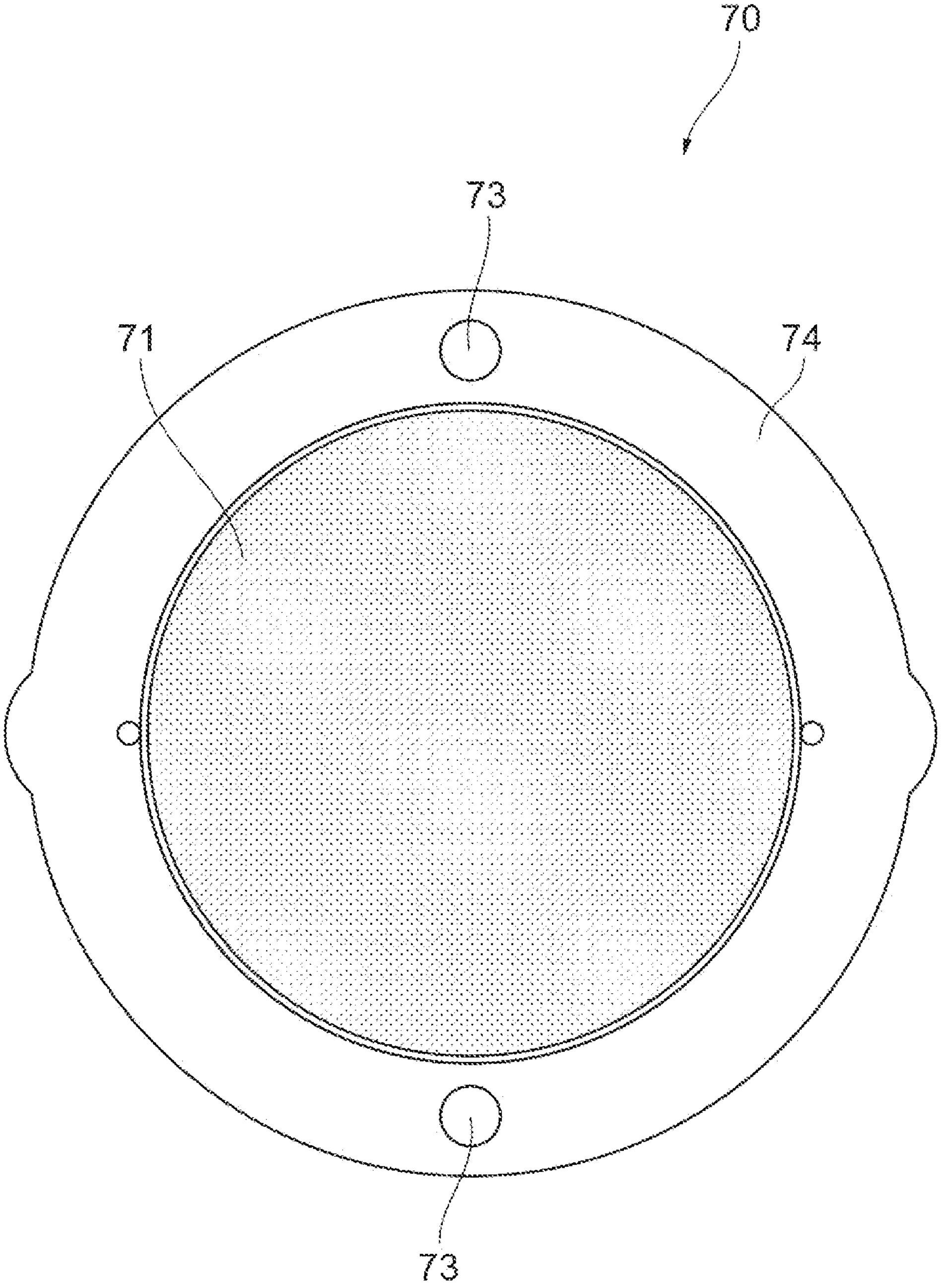
FIG. 12 is a cross-sectional view illustrating another example of an optical cable used for the optical cable member.

Although the optical cable member according to one embodiment of the present disclosure has been described above, the present disclosure is not limited to the above-described embodiments, and can be appropriately changed without departing from the gist of the claims. For example, in the above description, the optical cable used for the optical cable member 1 is the optical cable 10 with the spacer illustrated in FIGS. 3 and 4, but the content of the present disclosure may be applied to an optical cable having another configuration. For example, a spacer-less optical cable illustrated in FIG. 12 may be used. An optical cable 70 according to this modification includes a plurality of fiber units 71 having a large number of optical fibers, and the plurality of fiber units 71 are housed in a sheath 74. Then, a pair of tensile strength members 73 is embedded in the sheath 74. The configuration of the optical cable member 1 described above may be applied to one end of the optical cable 70. In this case, end portions of the pair of tensile strength members 73 are fixed by the fixing member 20 (pin 21). Other configurations are similar to those described above. In a case of using such an optical cable 70, it is possible to smoothly perform the towing work when laying the optical cable 70 as described above.

REFERENCE SIGNS LIST

1 Optical cable member
5 Towing member
10, 70 Optical cable
11, 71 Fiber unit
11*a* Optical fiber
12 Spacer
13, 73 Tensile strength member
14, 74 Sheath
15 Water absorption tape
16 Optical connector
17 Cable main body
18 Cable exposure portion
20 Fixing member
21 Pin
21*a* Inner hole
22 Fixing main body
23 Central portion
24 First attachment portion
24*a* Screw hole
25 Second attachment portion
25*a* Screw hole
26, 26*a*, 26*b* Through hole
30 First housing tube
31 First end
32 Second end
32*a* Through hole
32*b* Screw
40 Second housing tube
41 First end
41*a* Through hole
41*b* Screw
42 Second end
42*a* Through hole
42*b* Screw
51, 52 Cable fitting
53 Lid
54 Coupling member
55 Waterproof tape
56 Wire
60 Laying tube
61, 62 Cable

The invention claimed is:

1. An optical cable member, comprising:

an optical cable including at least one optical fiber and a tensile strength member each extending in a longitudinal direction, in which a cable main body housing the at least one optical fiber and the tensile strength member and a cable exposure portion in which the at least one optical fiber and the tensile strength member are exposed to an outside are provided along the longitudinal direction;

a fixing member fixing the tensile strength member at the cable exposure portion;

a first housing tube disposed between the fixing member and the cable main body, the first housing tube:

being a bendable member, housing the tensile strength member at the cable exposure portion, and allowing the at least one optical fiber at the cable exposure portion to extend therein; and a second housing tube disposed on a side opposite to the first housing tube at the fixing member in the longitudinal direction, the second housing tube housing the at least one optical fiber at the cable exposure portion, wherein the second housing tube is a bendable member, wherein the fixing member comprises a pin and a fixing main body, the pin being a component separate from the fixing main body, the pin fixing a distal end of the tensile strength member at the cable exposure portion, and an end of the pin being inserted into the fixing main body from a side of a first attachment portion of the fixing main body;

wherein the fixing main body is located between the first housing tube and the second housing tube, and includes the first attachment portion to which the first housing tube is attached and a second attachment portion to which the second housing tube is attached; and wherein the fixing main body is provided with at least one through hole extending along the longitudinal direction, and the at least one optical fiber at the cable exposure portion extends from the first housing tube to the second housing tube through the at least one through hole.

2. The optical cable member according to claim 1, wherein a minimum bending radius of the second housing tube is smaller than a minimum bending radius of the optical cable.

3. The optical cable member according to claim 1, wherein a minimum bending radius to the permissible extent of the first housing tube is smaller than a minimum bending radius to the permissible extent of the optical cable.

4. The optical cable member according to claim 1, wherein the first housing tube has an outer diameter smaller than an outer diameter of the second housing tube or twice an outer diameter of the cable main body.

5. The optical cable member according to claim 1, wherein the second housing tube has a length equal to or more than three times a length of the first housing tube.

6. The optical cable member according to claim 1, wherein at least one of the first housing tube and the second housing tube includes a metal flexible hose.

7. The optical cable member according to claim 1, further comprising:

a coupling member attached to a distal end of the second housing tube, wherein the coupling member, the second housing tube, and the fixing member are configured to transmit a tensile force applied to the coupling member to the tensile strength member via the second housing tube and the fixing member.

8. The optical cable member according to claim 1, wherein an optical connector is attached to a distal end of the at least one optical fiber at the cable exposure portion, and the optical connector is housed in the second housing tube, and wherein the second housing tube is attached to the fixing member so as to be detachable from the fixing member.

9. The optical cable member according to claim 1, wherein the at least one optical fiber includes 1000 or more optical fibers.

10. The optical cable member according to claim 1, wherein waterproof tape covers at least one of (i) a first outer peripheral region where the first housing tube is fixed to the fixing member and (ii) a second outer peripheral region where the second housing tube is fixed to the fixing member.

11. The optical cable member according to claim 10, wherein the first outer peripheral region and the second outer peripheral region are covered with the waterproof tape.

12. The optical cable member according to claim 1, further comprising a cable fitting located between the optical cable and the first housing tube.

13. A towing member for towing an optical cable including an optical fiber and a tensile strength member, the towing member comprising:

a fixing member configured to fix the tensile strength member of the cable;

a first housing tube attached to a first end of the fixing member, the first housing tube being a bendable member; and a second housing tube attached to a second end of the fixing member on a side opposite to the first end, wherein the second housing tube is a bendable member, wherein the fixing member comprises a pin and a fixing main body, the pin being a component separate from the fixing main body, the pin being configured to fix a distal end of the tensile strength member, and an end of the pin being inserted into the fixing main body from a side of a first attachment portion of the fixing main body;

wherein the fixing main body is located between the first housing tube and the second housing tube, and includes the first attachment portion to which the first housing tube is attached and a second attachment portion to which the second housing tube is attached; and wherein the fixing main body is provided with at least one through hole extending from the first attachment portion toward the second attachment portion.

14. The towing member according to claim 13, wherein a minimum bending radius of the second housing tube is equal to or more than 200 mm and equal to or less than 500 mm.

15. The towing member according to claim 13, wherein a minimum bending radius of the first housing tube is equal to or more than 300 mm and equal to or less than 500 mm.

16. The towing member according to claim 13, wherein the first housing tube has an outer diameter smaller than an outer diameter of the second housing tube, and the second housing tube has a length equal to or more than three times the length of the first housing tube.

17. The towing member according to claim 13, further comprising:

a coupling member attached to a distal end of the second housing tube, wherein the coupling member, the second housing tube, and the fixing member are configured to transmit a tensile force applied to the coupling member to the tensile strength member via the second housing tube and the fixing member.

18. The towing member according to claim 13, wherein the second housing tube is attached to the fixing member so as to be detachable from the fixing member.

19. The towing member according to claim 13, wherein the at least one through hole is divided into a pair of through holes each having a semicircular shape.

20. A method of towing an optical cable by using an optical cable member comprising:

an optical cable including at least one optical fiber and a tensile strength member each extending in a longitudinal direction, in which a cable main body housing the at least one optical fiber and the tensile strength member and a cable exposure portion in which the at least one optical fiber and the tensile strength member are exposed to an outside are provided along the longitudinal direction;
- a fixing member fixing the tensile strength member at the cable exposure portion;
- a first housing tube disposed between the fixing member and the cable main body, the first housing tube:
  - being a bendable member,
  - housing the tensile strength member at the cable exposure portion, and
  - allowing the at least one optical fiber at the cable exposure portion to extend therein; and
- a second housing tube disposed on a side opposite to the first housing tube at the fixing member in the longitudinal direction, the second housing tube housing the at least one optical fiber at the cable exposure portion, wherein the second housing tube is a bendable member,
- wherein the fixing member comprises a pin and a fixing main body, the pin being a component separate from the fixing main body, the pin fixing a distal end of the tensile strength member at the cable exposure portion, and an end of the pin being inserted into the fixing main body from a side of a first attachment portion of the fixing main body;
- wherein the fixing main body is located between the first housing tube and the second housing tube, and includes the first attachment portion to which the first housing tube is attached and a second attachment portion to which the second housing tube is attached; and
- wherein the fixing main body is provided with at least one through hole extending along the longitudinal direction, and the at least one optical fiber at the cable exposure portion extends from the first housing tube to the second housing tube through the at least one through hole, the method comprising:
- passing the optical cable through a laying tube; and
- removing the second housing tube of the optical cable from the fixing member after passing through the laying tube to expose a distal end portion of the at least one optical fiber.

21. A towing member for towing an optical cable including an optical fiber and a tensile strength member, the towing member comprising:
- a fixing member configured to fix the tensile strength member of the cable;
- a first housing tube attached to a first end of the fixing member; and
- a second housing tube attached to a second end of the fixing member on a side opposite to the first end, wherein the second housing tube is a bendable member,
- wherein the fixing member comprises a pin and a fixing main body, the pin being a component separate from the fixing main body, the pin being configured to fix a distal end of the tensile strength member, and an end of the pin being inserted into the fixing main body from a side of a first attachment portion of the fixing main body;
- wherein the fixing main body is located between the first housing tube and the second housing tube, and includes the first attachment portion to which the first housing tube is attached and a second attachment portion to which the second housing tube is attached,
- wherein the fixing main body is provided with at least one through hole extending from the first attachment portion toward the second attachment portion, wherein
- the second housing tube has a first end having through holes,
- the second attachment portion has screw holes provided at intervals on an outer periphery of the second attachment portion, and
- the second housing tube is detachably fixed to the fixing member by aligning the through holes with the screw holes and fastening them with screws.

22. The towing member according to claim 21, wherein a minimum bending radius of the second housing tube is equal to or more than 200 mm and equal to or less than 500 mm.

23. The towing member according to claim 21, wherein the first housing tube is a bendable member, and a minimum bending radius of the first housing tube is equal to or more than 300 mm and equal to or less than 500 mm.

24. The towing member according to claim 21, wherein the first housing tube has an outer diameter smaller than an outer diameter of the second housing tube, and the second housing tube has a length equal to or more than three times the length of the first housing tube.

25. The towing member according to claim 21, further comprising
- a coupling member attached to a distal end of the second housing tube, wherein the coupling member, the second housing tube, and the fixing member are configured to transmit a tensile force applied to the coupling member to the tensile strength member via the second housing tube and the fixing member.

26. The towing member according to claim 21, wherein the at least one through hole is divided into a pair of through holes each having a semicircular shape.

* * * * *